United States Patent [19]

Wirchansky et al.

[11] Patent Number: 4,749,584

[45] Date of Patent: Jun. 7, 1988

[54] LOW-FAT CHEESE BASE AND PRODUCTION THEREOF

[75] Inventors: Anastasia C. Wirchansky, Yonkers; Vivian C. DeVito, Tuckahoe, both of N.Y.

[73] Assignee: General Foods Corporation, White Plains, N.Y.

[21] Appl. No.: 893,502

[22] Filed: Aug. 5, 1986

[51] Int. Cl.$^4$ .................... A23C 19/076; A23C 20/00
[52] U.S. Cl. .................................... 426/582; 426/36; 426/61; 426/334
[58] Field of Search ............. 426/582, 334, 36, 61, 426/38–40, 330.2, 580

[56] References Cited

U.S. PATENT DOCUMENTS

| | | | |
|---|---|---|---|
| 3,591,390 | 7/1971 | Flickinger et al. | 426/582 |
| 4,244,983 | 1/1981 | Baker | 426/582 |
| 4,379,175 | 4/1983 | Baker | 426/582 |
| 4,568,555 | 2/1986 | Spanier | 426/582 |

*Primary Examiner*—Raymond N. Jones
*Assistant Examiner*—Marianne M. Cintins
*Attorney, Agent, or Firm*—Thomas A. Marcoux; Thomas R. Savoie; Daniel J. Donovan

[57] ABSTRACT

A method for preparing a smooth, low-fat cheese base suitable for as a partial or total replacement for conventional cheese use in cheese products, cheese spreads and cheese blends having a fat content of less than 3% by weight is herein disclosed. The product is prepared by admixing a cultured milk product having a fat content of less than 0.5%, with a stabilizer, and a buffer. The resulting product is then blended to achieve the desired texture and consistency and then set.

21 Claims, No Drawings

LOW-FAT CHEESE BASE AND PRODUCTION THEREOF

BACKGROUND OF THE INVENTION

The present invention relates generally to a method for producing a cheese product resembling cream cheese and suitable for use as a base for cheese products, cheese spreads and cheese blends, as a full or partial replacement for a full fat content cheese and more specifically to a smooth, low-fat cheese base which has a significantly reduced level of fat over that of conventional cheeses.

DESCRIPTION OF THE PRIOR ART

There has been a continuing trend among the American consuming public to look for products which have all the organoleptic characteristics of high calorie foods without the corresponding high levels of fat. The public has become more sensitive to the detriments of a high-fat, high-calorie diet and to that end researchers have concentrated their energies towards developing products which are as nutritious and palatable as their high-fat counterparts. In the dairy industry particularly, the high fat levels in some dairy products such as cream cheese have been deleted from the diets of these calorie conscious consumers in favor of low-fat products such as skim milk, low-fat milk and yogurt. Heretofore, high-fat contents were considered a necessary evil to maintain a desirable creamy mouthfeel and to avoid the powdery, grainy mouthfeel associated with prior low fat forms of these products. In recognition of this dilemma there have been several noteworthy attempts to develop a reduced fat cheese-like product.

U.S. Pat. Nos. 3,160,159 to Lundstedt et al. and 3,929,892 to Hynes et al. disclose a low-fat cream cheese product and method for making the same. However, the fat content of these products exceeds 10%, which is still unacceptable to those desiring a low fat product. U.S. Pat. Nos. 4,244,983 to Baker and 4,379,175 also to Baker teach the production of an imitation cream cheese product having fat contents of 5% and 4% respectively. However, these products are derived by admixing milk and other sources of fat with cottage cheese curd followed by heating to approximately 180° F. The additional fat and the heating step are required to obtain the desired texture and uniform consistency. Although the fat content of the products of these disclosures is significantly reduced over the prior art, they require a heating step and the addition of alternate sources of fat to achieve the desired cream cheese-like texture and consistency. It would therefore be desirable to produce a nutritious, palatable imitation cheese-like product which has a texture and consistency similar to conventional cream cheese and which has a fat content substantially below 3% by weight without the need for an additional fat source or heating.

SUMMARY OF INVENTION

The primary objective of the present invention is to provide a smooth, low-fat cheese base which resembles cream cheese in texture and appearance but which has a fat content substantially below that of conventional cream cheese and imitation cheese products. It is another object of this invention to provide a method for making a nutritous, palatable cheese product which has a creamy mouthfeel similar to conventional cream cheese and which has a fat content substantially below 3% by weight. A further object of this invention is to provide a smooth, low-fat cheese base suitable for use as a base for cheese products, cheese spreads and cheese blends. Other objects and advantages will become apparent from the following description and appended claims.

In accordance with the aforesaid objectives, the present invention provides a process for making a smooth, low-fat cheese base resembling cream cheese in taste, texture and appearance which includes the steps of intimately blending a cultured milk product having a fat content less than 0.5% selected from the group consisting of dry curd cottage cheese, baker's cheese or a combination thereof and which is the major constituent of the low-fat cheese base prepared hereby, a stabilizer, and a buffer for a time sufficient to form a substantially uniform mixture, and allowing the resulting mixture to set. Optionally, the cheese product may first be centrifuged to remove the excess whey and water, prior to the addition of the other ingredients. The mixture, after blending may also be passed through refining rolls to achieve a smooth, cream cheese-like texture.

The smooth, low-fat cheese base of the present invention comprises a major amount of a cultured milk product having a fat content of less than 0.5% such as cottage or baker's cheese curd and minor amounts of stabilizer, and a buffer. Most importantly, the product of the present invention has a total fat content by weight of less than 3% fat, and contributes only about 15 calories per 1 ounce serving to the diet (approximate less than 1 calorie/gram).

DETAILED DESCRIPTION OF THE INVENTION

The smooth, low-fat cheese base of the present invention is prepared by admixing a cultured milk product having a fat content of less than 0.5% with a stabilizer and a food grade buffer. By cultured milk product is meant those products in which curd formation has been induced by the addition of a microorganism. Preferably the cultured milk product is one having a fat content of less than 0.5% such as Baker's cheese curd or cottage cheese curd. The cultured milk products having higher fat contents such as yogurts, sour creams or buttermilk are excluded. Most preferably, the cultured milk product is a dry curd cottage cheese having a fat content of less than 0.5% and comprising from about 15–25% by weight non-fat milk solids and 75 to 85% by weight of water.

To prepare the smooth, low-fat cheese base of the present invention, the selected cultured milk product which will typically comprise from about 90 to about 99.5% by weight of the low fat cheese base and more preferably from about 95 to about 99.5%, is admixed with a stabilizer. The stabilizer, which consists of a combination of guar gum, locust bean gum and carrageenan, preferably equal amounts of each, is added to the cultured milk product in an amount ranging from about 0.3 to about 0.72% by weight of the total low fat cheese base. Optionally, dextrose may be utilized as a carrier for the gums of the stabilizer. To this mixture is added a food grade buffer which may be selected from the group consisting of the alkali salts of citrate, bicarbonate and lactate in a amount consisting of from about 0.10 to about 1.15% by weight of the total low fat cheese base. Preferably, the buffer is sodium bicarbonate and comprises from about 0.15 to about 1.0% by weight of the low fat cheese base. Where the buffer to be used is trisodium citrate, it should comprise from about 0.15% to about 0.4% by weight of the total low-fat cheese base.

The resulting product is then blended preferably under high shear conditions for a time sufficient to form a substantially fluid mixture. By high shear blending is meant conditions sufficient to impart the energy needed to disrupt the curd such that intimate contact is obtained between the disrupted curd and the other ingredients. It has been found that a conventional blender is sufficient to accomplish this purpose. The resulting blended mixture is then set, preferably by cooling for a period of from about 4 to 10 hours and a temperature of from about 30° to 50° F. The product after blending and setting should have a pH of from about 4.2 to about 5.0.

Optionally, the cultured milk product may be initially centrifuged to remove any excess whey prior to admixing with the stabilizer and buffer. The blended mixture of cultured milk product, stabilizer and buffer may also be passed through refining rolls prior to selling to achieve a more smooth and creamy consistency. By refining rolls is meant a series of rollers through which the blended mixture is passed to break down the structure and particles to a smooth, creamy texture. Preferably, the spaces between the refining rolls should be from about 0.125 mm to about 0.41 mm. These optional steps of centrifuging and refining rolls may be desirable when the low-fat cheese base is to replace a majority of the high-fat cheese component of a cheese containing product to achieve maximum smoothness and consistency. Additional ingredients such as sugar, in a range of from about 0.75 to about 1.0% salt, in a range of from about 0.7 to about 1.0% by weight and any other FDA approved food grade flavorants may be added to adjust the taste of the cheese base.

The resulting product is a creamy, bland, low-calorie, low-fat cheese base. This product will have a fat content of from 0.1 to 1.0% fat by weight and more preferably about 0.3 to about 0.5%. The caloric content will be generally less than 1 calorie per gram, preferably from 0.7 to about 0.9 calories per gram. This product is suitable for use in the preparation of food products containing high fat cheeses such as cheese cakes, cheese spreads and cheese blends. It may be utilized as a partial or total replacement for the cheese component present within these products. When used as a partial replacement for the cheese component of a cheese containing product, the low-fat cheese base may comprise from about 10 to about 99% by weight of a total cheese product and more preferably from about 40 to about 75% on a total weight basis. The resulting product containing the cheese base will have a fat content of from about 0.5 to about 3% by weight. The following examples illustrate the practice of the present invention and is intended to exemplify and not to limit in any respect the content and scope thereof.

While the present invention has been described with reference to specific embodiments thereof, it will be understood that numerous modifications may be made by those skilled in the art without actually departing from the scope of the claimed invention. Accordingly, modifications and equivalents may be resorted to which fall within the scope of the invention as claimed.

EXAMPLE I

Dry curd cottage cheese comprising approximately 99.16% on a total weight basis was admixed with approximately 0.5681% of a stabilizer consisting of the following ingredients:

| guar gum | 3.33% |
|---|---|
| locust bean gum | 3.33% |
| carrageenan | 3.33% |
| dextrose (as a carrier) | 90.0% |

To this mixture was added sodium citrate comprising 0.1826% and sodium bicarbonate comprising 0.0808%. The resulting mixture was mixed in a blender for approximately 7 minutes and allowed to cool in a refrigerator for approximately 5 hours to form a low-fat cheese base for use as a total or partial replacement for conventional cheese in a cheese containing food product.

In a similar manner the dry curd cottage cheese was admixed with approximately 0.5% guar gum alone followed by the addition of sodium citrate and sodium bicarbonate. The resulting mixture was blended and cooled. The resulting product failed to set and was unsuitable for use as a cheese base.

EXAMPLE II

A low-fat, low-calorie cheese cake was prepared from the low-fat cheese base prepared in Example I. An amount of the cheese base product of Example I comprising approximately 25.09% on a total weight basis of the cheese cake was combined with the below listed ingredients:

| Ingredient | % by weight |
|---|---|
| Baker's cheese | 18.8 |
| neufchatel cheese | 4.00 |
| sugar | 13.50 |
| salt | 0.38 |
| potassium sorbate | 0.12 |
| vanilla flavors | 0.24 |
| whole fresh eggs | 15.60 |
| water | 21.72 |
| starch | 0.35 |
| xanthan gum | 0.20 |

The ingredients were mixed in a blender for approximately 7 minutes and baked in an internal temperature of 150° F. at a temperature of 390° F. to form a low-fat, low calorie cheese cake wherein the low-fat cheese base was used as a partial replacement for conventional cheese.

EXAMPLE III

Dry curd cottage cheese was centrifuged for approximately 1 minute to remove excess water and whey. The resulting curd representing 97.3328% of the total product was admixed with the following ingredients:

| sodium citrate | 0.1826% |
|---|---|
| sodium bicarbonate | 0.0808% |
| salt (NaCl) | 0.897% |
| stabilizer | 0.5681% |
| (of example I) | |
| sugar | 0.9387% |

The resulting product was mixed in a Hobart blender for approximately 7 minutes and passed through refining rolls having a space of approximately 0.3 mm. The resulting product was then cooled for 5 hours to form a low-fat cheese base for use as a total or partial replacement for conventional cheese in a cheese-containing food product.

EXAMPLE IV

An amount of the low-fat cheese base of Example III comprising 63.7042% on a weight basis was combined with the following ingredients:

| sugar | 17.5409 |
|---|---|
| eggs | 15.3135 |
| milk | 3.3411 |
| flavoring (vanilla) | 0.1003 |

The resulting mixture was mixed in a blender for approximately 7 minutes and baked for 60 minutes at a temperature of 350° and slowly cooled to form a low-fat, low-calorie cheese cake wherein the low-fat cheese base was used as a total replacement for conventional cheese.

EXAMPLE V

An amount of the low-fat cheese base of Example III comprising 63.7042% by weight was mixed with the following ingredients:

| sugar | 17.5409 |
|---|---|
| eggs | 15.3135 |
| whole milk | 3.3411 |
| vanilla flavoring | 0.1003 |

The resulting mixture was blended for 7 minutes and passed through the refining rolls of Example III.

An amount of this mixture was combined with conventional cream cheese wherein the cream cheese comprised 25% by weight and the base mixture comprised 75% by weight. These components were blended to form a low-fat cheese spread.

What is claimed is:

1. A method for making a low fat cheese base product which consists essentially of a cultured milk product, stabilizer and buffer and said method consists essentially of the steps of:
   (a) intimately blending a cultured milk product selected from the group consisting of Baker's cheese curd, cottage cheese curd, or combinations thereof having a fat content of less than 0.5% said cultured milk product being in an amount of from about 90 to about 99.5% by weight of the cheese base with a stabilizer consisting of a combination of guar gum, locust bean gum, and carrageenan, said stabilizer being in an amount from about 0.3 to about 0.72% by weight of the low fat cheese base, and a food grade buffer selected from the group consisting of the alkali salts of citrate, bicarbonate and lactate, said buffer being in an amount from about 0.1 to about 1.15% by weight of the total low fat cheese base, for a period of time sufficient to form a substantially uniform and fluid mixture; and
   (b) setting the blended mixture of step (a) by cooling for a period of from about 4 to 10 hours at a temperature of from 30° to about 50° F.

2. The method of claim 1 wherein the cultured milk product is cottage cheese curd.

3. The method of claim 1 wherein the buffer of step (a) is sodium bicarbonate which comprises from about 0.15 to about 1.0% by weight of the cheese base.

4. The method of claim 1 wherein the buffer of step (a) is trisodium citrate which comprises from about 0.15 to about 0.4% by weight of the cheese base.

5. The method of claim 1 wherein the blended mixture of step (a) is further passed through refining rolls to achieve a smooth, cream cheese-like texture.

6. The method of claim 5 wherein the refining rolls have a space between the rolls of from about 0.125 mm to about 0.41 mm.

7. The method of claim 1 wherein the cheese base has a fat content of from about 0.1 to about 1.0%.

8. The method of claim 7 wherein the cheese base has a fat content of from about 0.3 to about 0.5% by weight.

9. The method of claim 1 wherein the cheese base has a pH of from about 4.2 to about 5.0.

10. The method of claim 1 wherein the cheese base has a caloric content of less than 1 calorie per gram.

11. A smooth, low fat cheese base consisting essentially of:
    (a) a cultured milk product having a fat content of less than 0.5% in an amount ranging from about 90 to about 99.5% by weight of the low fat cheese base;
    (b) a stabilizer which consists of a combination of guar gum, locust bean gum, carrageenan, and comprises from about 0.3 to about 0.72% by weight; and
    (c) a buffer selected from the group consisting of the alkali salts of citrate, bicarbonate and lactate and which comprises from about 0.15% to about 1% by weight.

12. The product of claim 11 wherein the cultured milk product is selected from the group consisting of dry curd cottage cheese, baker's cheese curd and combinations thereof.

13. The product of claim 11 wherein the cultured milk product is cottage cheese curd.

14. The product of claim 11 further containing about 0.75 to about 1.0% by weight of sugar.

15. The product of claim 11 further containing about 0.7 to about 1.0% by weight of salt.

16. The product of claim 11 wherein the cheese base has a caloric content of less than 1 calorie per gram.

17. The product of claim 11 wherein the cheese base has a fat content of from about 0.1 to about 1.0% by weight.

18. The product of claim 17 wherein the cheese base has a fat content of from about 0.3 to about 0.5% by weight.

19. A food product having a fat content of from about 0.5 to about 3% containing from about 10 to 99% of the cheese base of claim 11.

20. The product of claim 19 wherein the food product is a cheese cake.

21. The product of claim 20 wherein the cheese cake contains from about 40 to about 75% of the cheese base.

* * * * *